(12) United States Patent
Edland

(10) Patent No.: US 7,878,749 B2
(45) Date of Patent: Feb. 1, 2011

(54) BREAKAWAY W-BASE FASTENER

(75) Inventor: David W. Edland, Chippewa Falls, WI (US)

(73) Assignee: Illinois Tool Works Inc., Glenview, IL (US)

(*) Notice: Subject to any disclaimer, the term of this patent is extended or adjusted under 35 U.S.C. 154(b) by 29 days.

(21) Appl. No.: 11/874,311

(22) Filed: Oct. 18, 2007

(65) Prior Publication Data

US 2008/0166206 A1 Jul. 10, 2008

Related U.S. Application Data

(60) Provisional application No. 60/878,825, filed on Jan. 5, 2007.

(51) Int. Cl.
*F16B 19/00* (2006.01)
(52) U.S. Cl. .......................................... 411/508; 24/297
(58) Field of Classification Search ................ 411/508, 411/509, 41, 44, 48; 24/297
See application file for complete search history.

(56) References Cited

U.S. PATENT DOCUMENTS

| | | | | |
|---|---|---|---|---|
| 4,312,614 A | * | 1/1982 | Palmer et al. | 411/44 |
| 4,728,068 A | * | 3/1988 | Rivkin | 248/220.31 |
| 5,797,714 A | | 8/1998 | Oddenino | |
| 5,851,097 A | | 12/1998 | Shereyk et al. | |
| 6,511,273 B2 | * | 1/2003 | Arisaka | 411/48 |
| 6,652,206 B2 | * | 11/2003 | Heflin et al. | 411/48 |
| 6,910,840 B2 | * | 6/2005 | Anscher | 411/41 |
| 7,018,152 B2 | * | 3/2006 | Arisaka | 411/41 |
| 7,152,281 B2 | * | 12/2006 | Scroggie | 24/297 |
| 2006/0231690 A1 | | 10/2006 | Cooley et al. | |

FOREIGN PATENT DOCUMENTS

EP   1 71 2801 A   10/2006

OTHER PUBLICATIONS

International Search Report for PCT/US2007/086469.

* cited by examiner

*Primary Examiner*—Gary Estremsky
(74) *Attorney, Agent, or Firm*—Paul F. Donovan; Mark W. Croll

(57) ABSTRACT

A w-base fastener that may be used in many applications, including numerous applications throughout the automotive industry, combines the functionality of a w-base fastener with the serviceability of other fasteners. The w-base fastener of the invention provides the ability to service the w-base fastener without damaging the panel or hole in which the fastener is inserted. This is accomplished by incorporating a break joint configured to break at a predetermined load. This break joint permits the fastener to be easily extracted when it breaks under the predetermined load. As the two sections of the fastener are separated, hooks on the fastener body engage tabs on the legs and pull the legs of the w-base fastener inward to prevent interference between the legs and the panel as the fastener is extracted from the hole.

19 Claims, 9 Drawing Sheets

BREAKAWAY W-BASE FASTENER

CROSS REFERENCE TO RELATED APPLICATIONS

This Non-Provisional Application claims benefit to U.S. Provisional Application Ser. No. 60/878,825 filed on Jan. 5, 2007.

FIELD OF THE INVENTION

The present invention relates generally to fasteners, and more particularly, to w-base fasteners.

BACKGROUND OF THE INVENTION

It is known that fasteners are used in various applications to perform various functions. It is further known that numerous types of fasteners are used in various automotive applications. A common fastener that is widely used throughout a vehicle is known as a w-base clip or w-prong fastener (hereinafter "w-base fastener"). The w-base fastener and its fastening scheme provide a simple yet effective solution to many fastening needs. As a result, this fastener is economical, functional, and widely accepted among the automotive industry. Exemplary w-base fasteners are disclosed in U.S. Pat. Nos. 5,851,097 and 5,797,714, both assigned to Illinois Tool Works, Inc.

Regardless of size or complexity, the w-base fastener utilizes some basic principles in fastening. These principles include multiple legs that compress towards a common member, of which the legs are attached, during the installation in a hole. These legs then expand to engage the backside of the hole to which the fastener is mounted to hold the fastener in a mounted position within the hole. The fastener also includes a head or similar structure that permits items to be mounted to the fastener. The w-base fastener provides an excellent method of retention with an outstanding insertion to extraction force ratio.

A known drawback exists, however, when servicing or replacing the known w-base fastener. This problem occurs when the backside of the hole in which the fastener is inserted is not accessible for disengagement of the legs. In this situation, which is a common occurrence in a vehicle, the hole may be damaged upon extraction of the w-base fastener, rendering the hole useless. In other situations, the legs of the fastener may break at a certain load, with the resulting broken w-base pieces remaining in the hole. The invention overcomes these and other known problems by providing a means of securing the w-base fastener to the hole with the option of servicing or replacing the fastener should the need arise without damaging the hole when the fastener is extracted and without leaving any portion of the fastener in or behind the hole.

SUMMARY OF THE INVENTION

The present invention is directed to a w-base fastener that may be used in many applications, including numerous applications throughout the automotive industry. The invention provides a fastener that combines the functionality of a w-base fastener with the serviceability of other fasteners. Indeed, the invention provides the ability to service the w-base fastener without damaging the panels or hole in which the fastener is inserted.

The invention achieves this desired serviceability by providing a w-base fastener that incorporates a breakaway or extension element. This element can be one of multiple embodiments that achieve this serviceability objective. Upon insertion, the w-base fastener of the invention functions in a manner similar to known w-base fastener designs. That is, the legs flex inward toward a common member by pressure exerted on the legs by the edge of the hole. After completely passing through the hole, the legs flex outward creating an interference fit between the backside of the hole and the legs, thereby securing the fastener to the hole. A break point or extension joint is provided in the base of the fastener to either detach or extend under a predetermined load, such as during separation of a secondary panel from a primary panel. The fastener is configured to include hooks disposed on the body to grab the w-base legs during removal and force the legs to collapse during extraction of the fastener from the hole so that the entire fastener can pass freely through the hole without causing damage to the hole.

Other features and advantages of the invention will become apparent to those skilled in the art upon review of the following detailed description, claims and drawings in which like numerals are used to designate like features.

Figure 1:
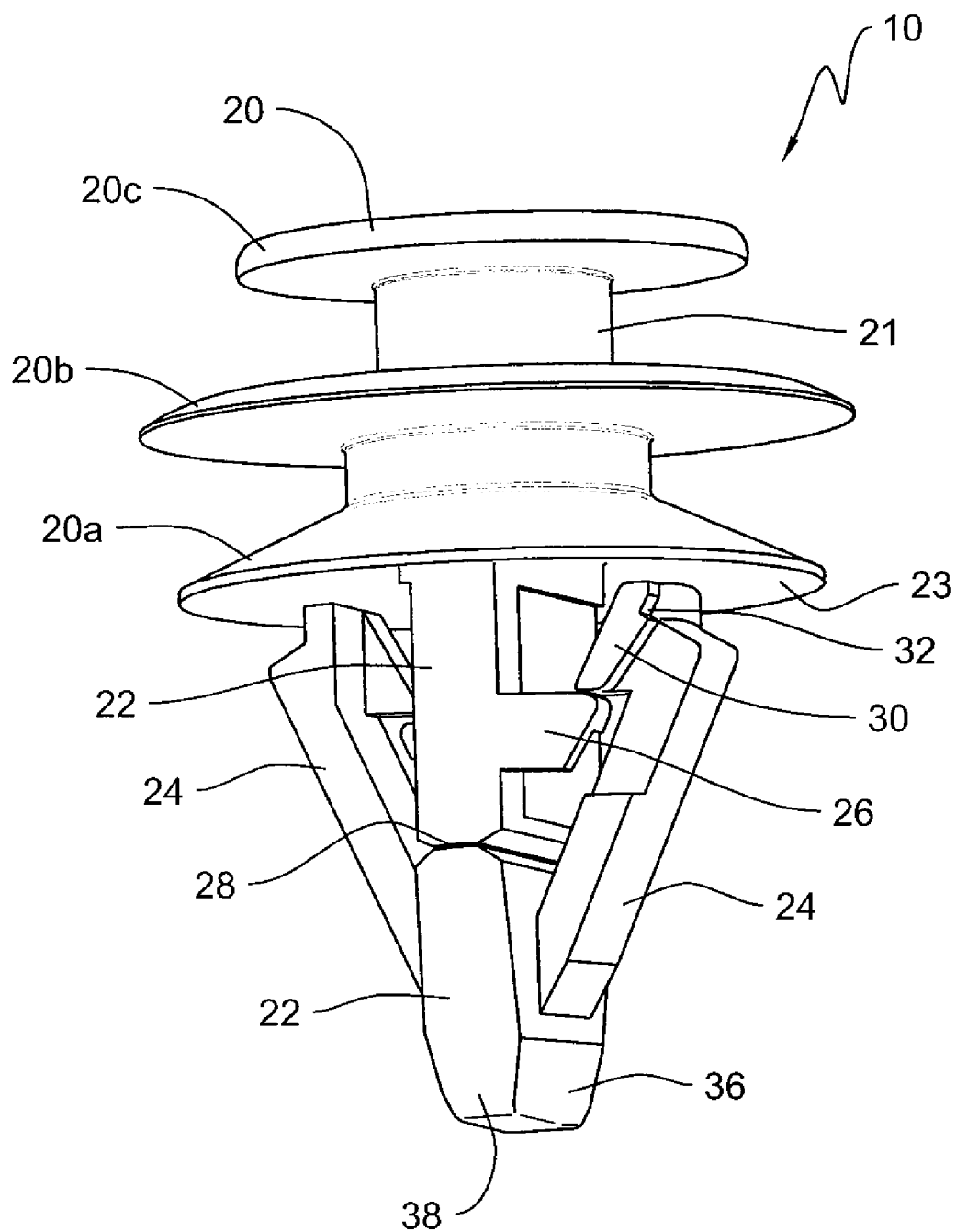
FIG. 1 is an isometric view of an exemplary embodiment of a w-base fastener of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

The present invention may be embodied in many forms. In one exemplary embodiment depicted in FIG. 1, the present invention is directed to a w-base fastener or clip 10 that, as discussed below, provides the ability to service the w-base fastener without damaging the panel and/or hole in which the fastener is inserted, and without leaving any portion of the fastener in the hole. Additionally, the invention provides the functionality of traditional w-base fasteners with the serviceability of other fasteners.

Figure 2:
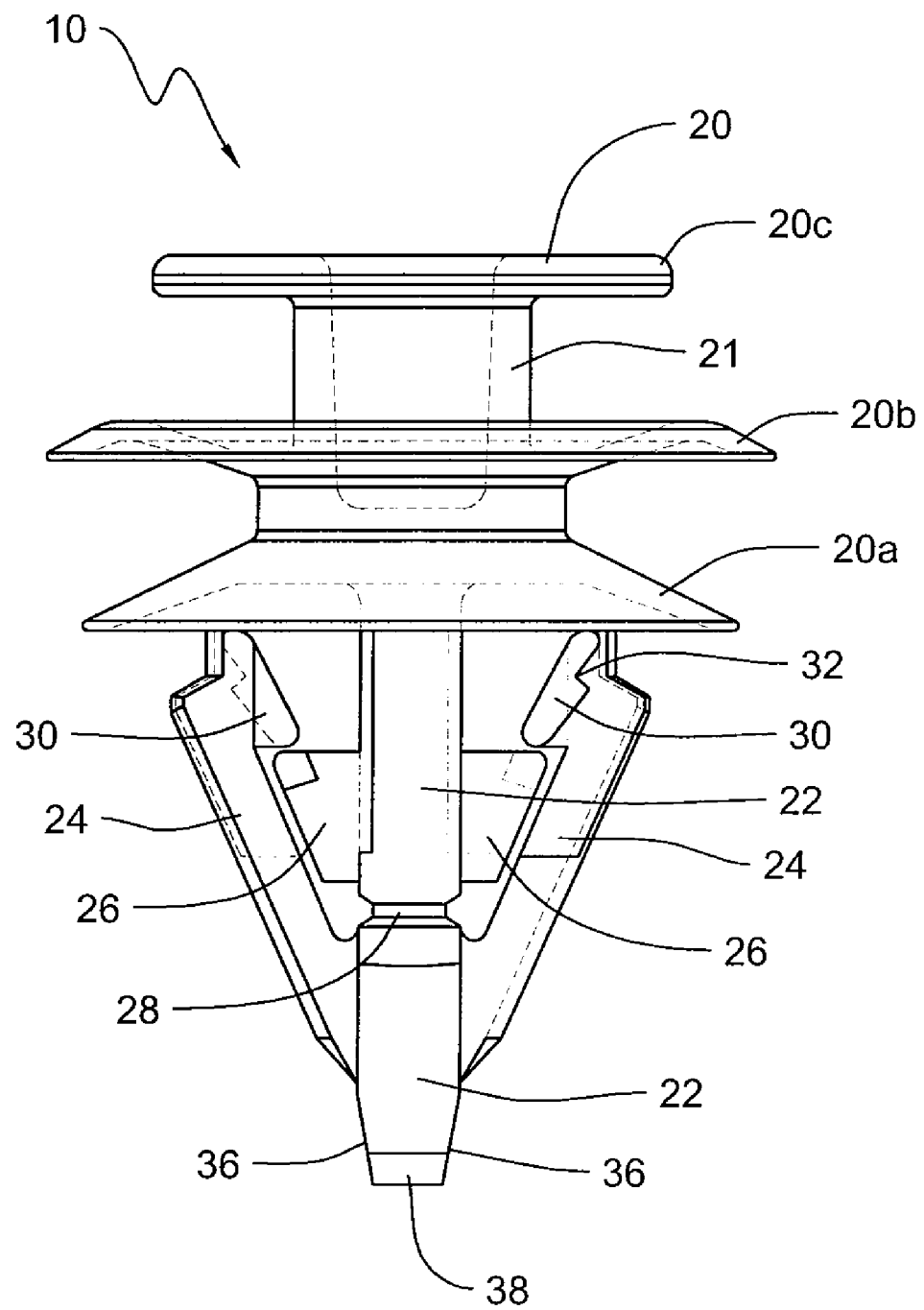
FIG. 2 is a side view of the embodiment of FIG. 1.

Referring to FIGS. 1 and 2, the w-base fastener 10, which may be made of plastic or any other suitable material, includes a head 20, a body 22, and a plurality of legs 24 that are joined to the body 22 below a break point or extension joint 28. The head 20 is used to prevent the fastener 10 from completely passing through the panel or hole in which the fastener is mounted. The head 20 may define numerous shapes and configurations, including the depicted multi-disk-shaped configuration. The head 20 may define a first, second and third disc-shaped head portion 20a, 20b and 20c, respectively. As further illustrated in FIG. 1, the first head portion 20a may define a disc-shape angularly extending contact surface 23 that, in use, serves to prevent the fastener 10 from completely passing through the panel or hole in which the fastener 10 is mounted. This is accomplished by the configuration of the head portion 20a, which defines a diameter that is greater than the diameter of the hole in which the fastener is mounted. As mounted to a panel, the angular configuration of the head portion 20a may provide a resiliency, similar to a spring washer, to further secure the fastener 10 to the panel.

The second head portion 20b and third head portion 20c may serve as mounting members to permit other structures or items to be mounted to the fastener 10 vis-à-vis the second and third head portions. The second head portion 20b and third head portion 20c may be disc-shaped or define other shapes and may be joined together by, and spaced apart from each other by an intermediate portion 21. The intermediate portion 21 defines a diameter that is less than the diameters of the second head portion 20b and third head portion 20c and a height that permits adequate spacing between the second head portion 20b and third head portion 20c. As can be appreciated, with the depicted configuration, items or other structures may be mounted to the intermediate portion 21 between the second and third head portions. One of skill in the art will appreciate that the head 20 may define numerous other known head configurations that permit the mounting of other structures to the fastener 10 and that prevent the fastener from being pulled through the hole or panel to which it is mounted. Consequently, the illustrated head 20 is merely an example of one of the many possible configurations.

Continuing to refer to FIGS. 1 and 2, connected to or formed integral with the head 20 is the body 22 or common member. The body 22 may extend outwardly from the head portion 20a and define an elongated member that provides the structure on which a plurality of legs 24 may be attached. The body 22 may define a cylindrical or rectangular configuration or any other possible configuration. In the exemplary embodiment, a plurality of hooks 26 may be attached to the body 22 between the break joint 28 and the head 20a. The hooks 26 extend outwardly, such as perpendicularly, from the body 22 to engage the legs 24 during extraction and force the legs 24 to bend inward towards body 22. As depicted, one hook 26 extends between the body 22 toward each leg 24. The hooks 26 are joined to the body 22 below tab 30 of each leg 24.

In use during removal of the fastener 10, once the head 20 is pulled and the break joint 28 has been broken, the portion of the fastener 10 above the break joint may be moved upward to cause the hook 26 to engage the tab 30 on the leg 24. This engagement causes the legs 24 to move inward toward the body 22. Drawing each leg 24 toward the body 22 allows the entire fastener 10 to be removed without interference with the edge of the hole. In the embodiment shown, the tab 30 may be angled to correspond to the angle of the hook 26. The hook 26 may define numerous configurations that serve to connect the body 22 to each leg 24 during extraction and provide a technique for pulling or drawing each leg 24 toward the body 22.

Figure 3:
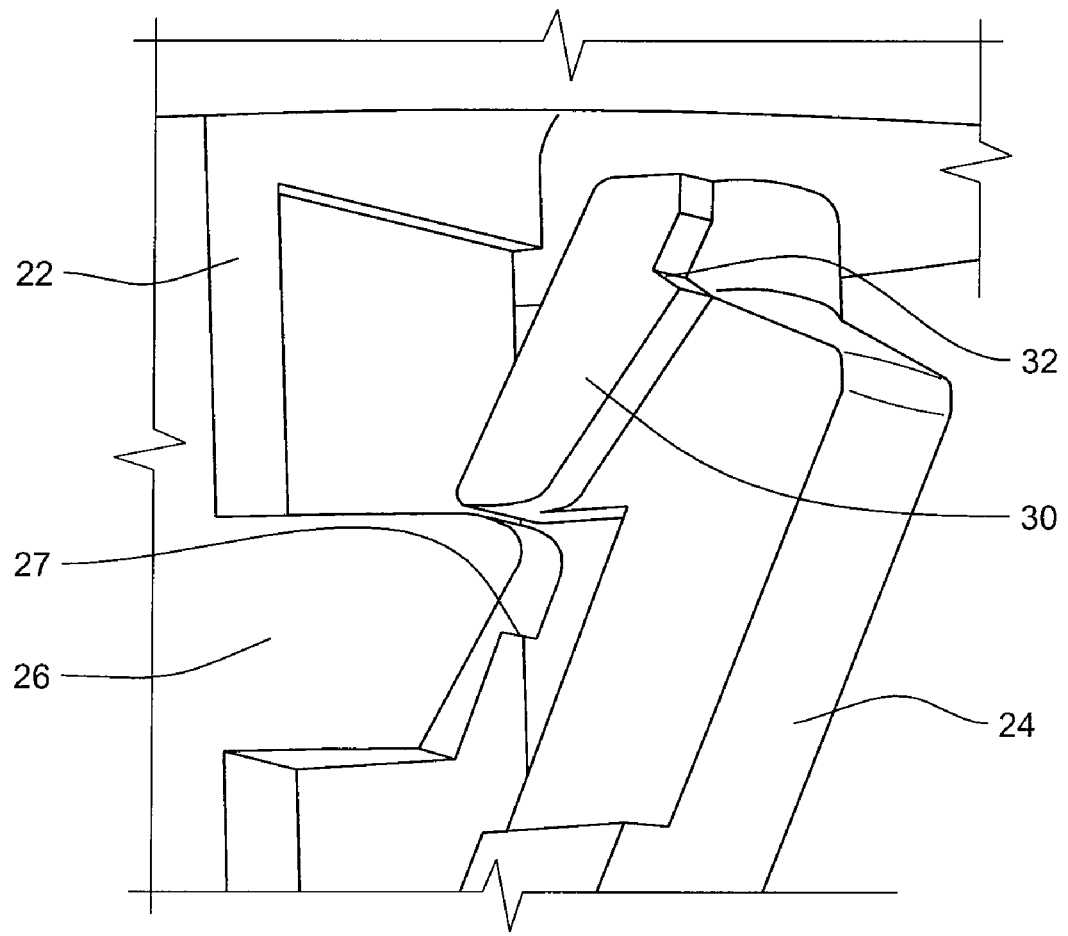
FIG. 3 is a close-up isometric view of a hook element and a leg element of the embodiment of FIG. 1.

FIG. 3 provides a close-up isometric view of FIG. 1 and includes the hook 26 and tab 30 areas of fastener 10. In one embodiment, as the legs 24 are drawn toward the body 22, the tab 30 moves in a downward direction. In this embodiment, with additional reference to FIG. 8, a leg tab notch 32 disposed on an upper end of the tab 30, engages with a hook tab 27 to lock the legs 24 with the hook tab 27 on hook 26 to stop the downward direction of the tab 30 and keep the tab 30 secured during extraction. The hook tab 27 may be configured to generally correspond in shape to the leg tab notch 32 to provide secure engagement of the hook tab 27 and leg tab notch 32.

Figure 4:
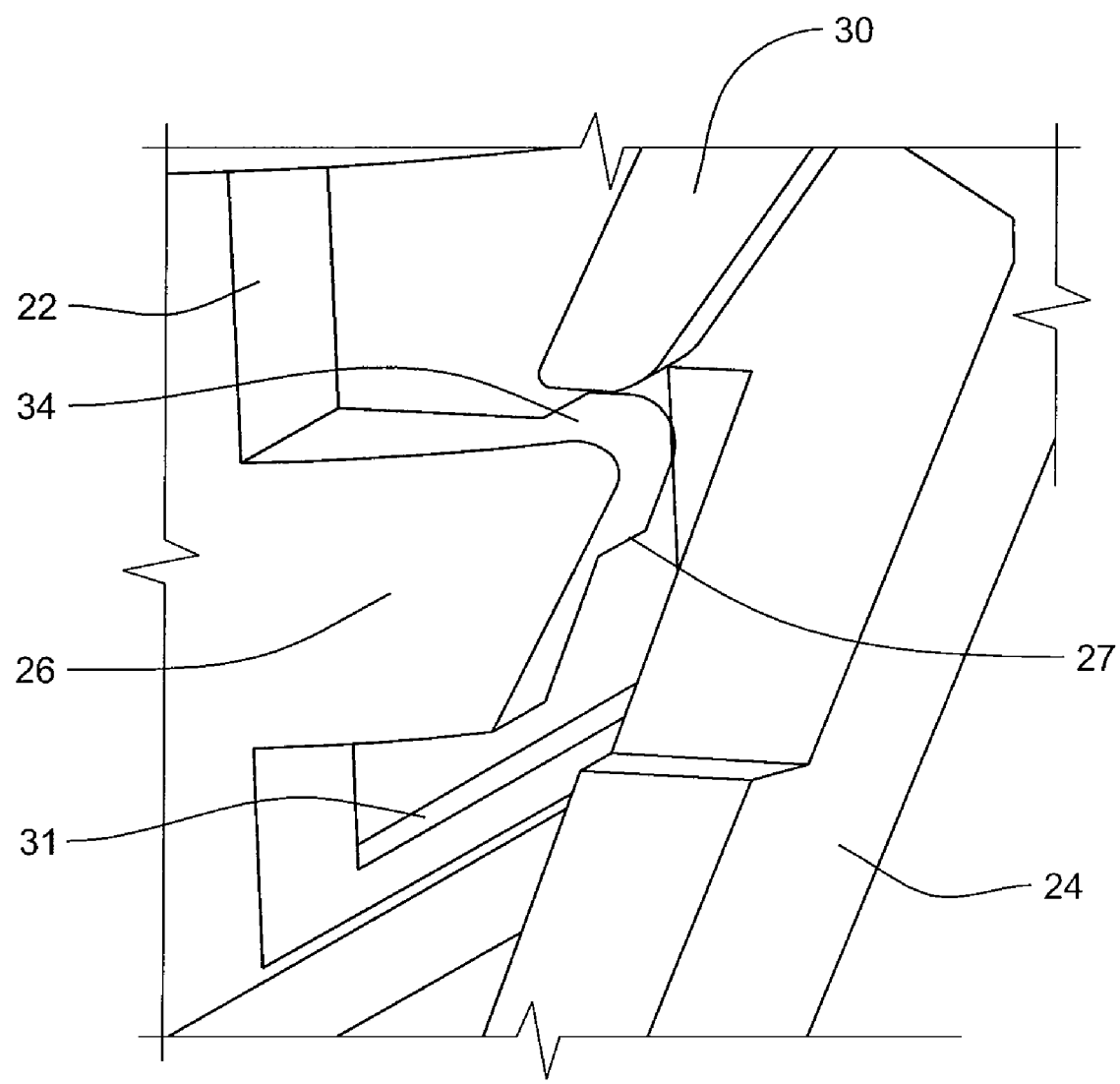
FIG. 4 is a close-up isometric view of a hook element and a leg element of an additional embodiment of a w-base fastener of the present invention.
Figure 8:
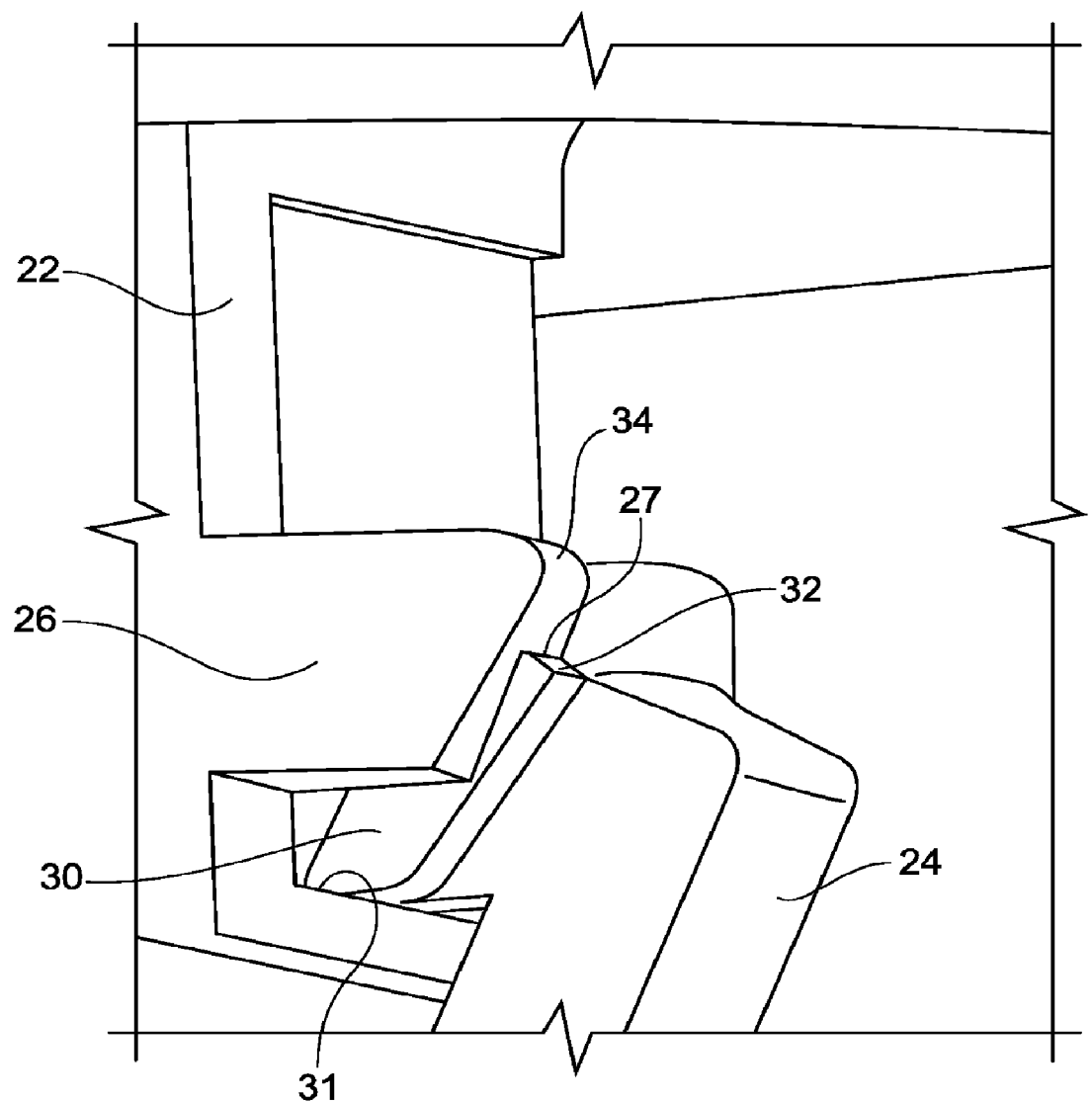
FIG. 8 is a close-up isometric view of the hook and leg element of FIG. 3 shown in another position.

As shown in the embodiment illustrated in FIG. 4 and FIG. 8, hook 26 may further comprise a lead-in element 34 to assist in the initial engagement of tab 30 to hook 26. The embodiment may also include a ledge 31 disposed on body 22, the ledge 31 configured to provide a positive stop for the downward movement of leg 24 once it is engaged by hook 26 and drawn in towards the body. The ledge 31 may thus prevent the leg 24 from being capable of sliding below the hook 26.

Referring back to FIG. 2, the legs 24 are joined at the common end 38 which may form or define a point or tip that is configured to facilitate the insertion of the fastener 10 into the panel or other surface to which the fastener is mounted. In an embodiment, the body 22 defines opposing tapered portions 36 that enhance the insertion of the fastener 10 into the panel or hole in which the fastener 10 is mounted.

By way of further illustration, the releasable connection between a panel and fastener 10 will provide a desired level of retention force but not enough retention to cause damage to the panel or other material to which the fastener is mounted. For example, the material surrounding a hole in a panel of a 0.8 inch thick sheet of metal might deform if 100 pounds of extraction force is applied. If a specific application requires 50 pounds of retention force, but the w-base fastener requires 120 pounds of force before it will extract from the hole, the panel will become damaged if the 120 pounds of force is exerted on the fastener to remove it from the hole. The invention alleviates this problem by providing a break joint 28 that will be activated at a load between the required load such as 50 pounds and the maximum load such as 100 pounds.

Figure 5:
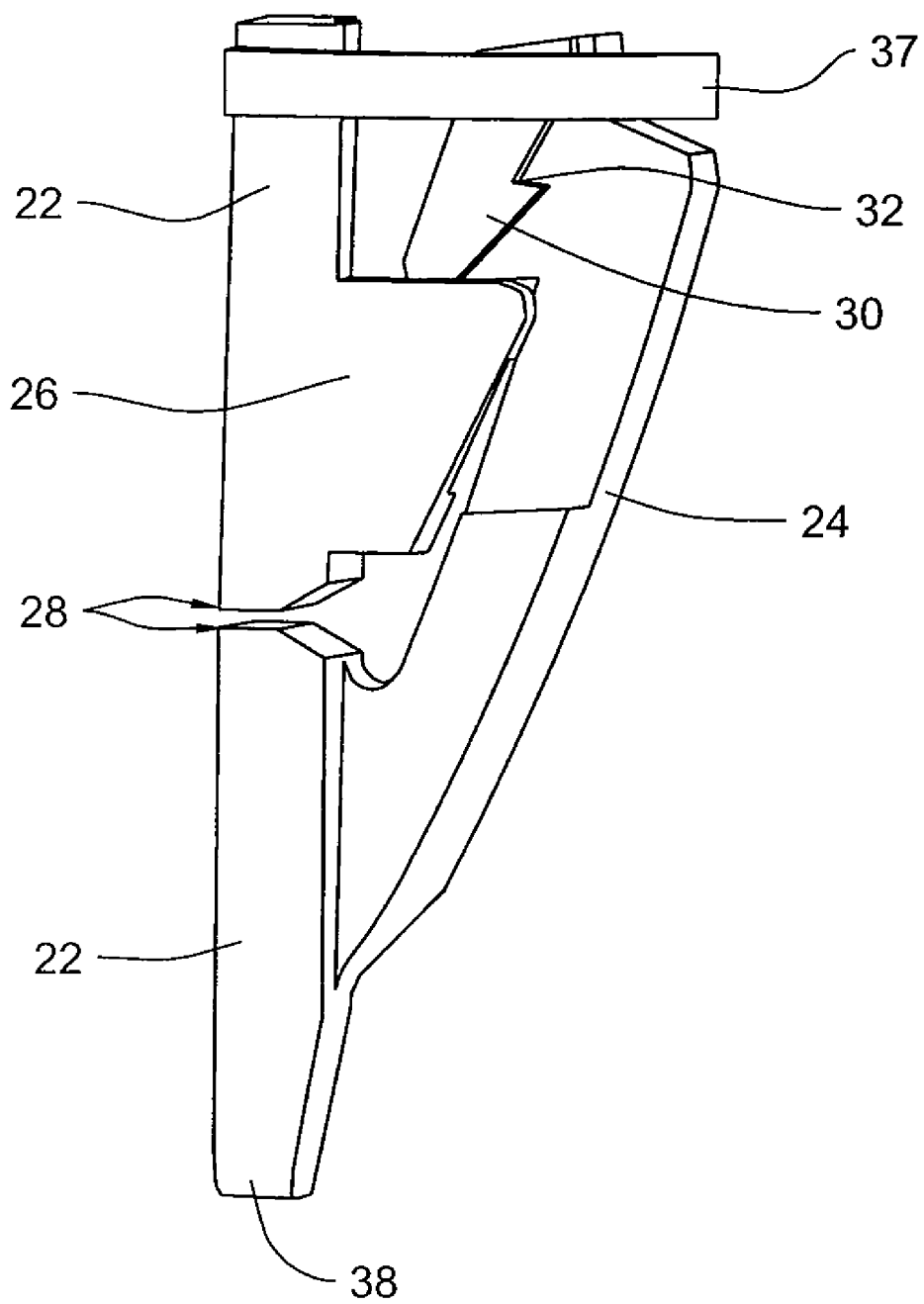
FIG. 5 is an isometric partial view of an exemplary embodiment of an installed w-base fastener of the present invention, illustrating the positions of the hook and leg after the fastener has been subjected to a load sufficient to separate the fastener at the break joint.
Figure 6:
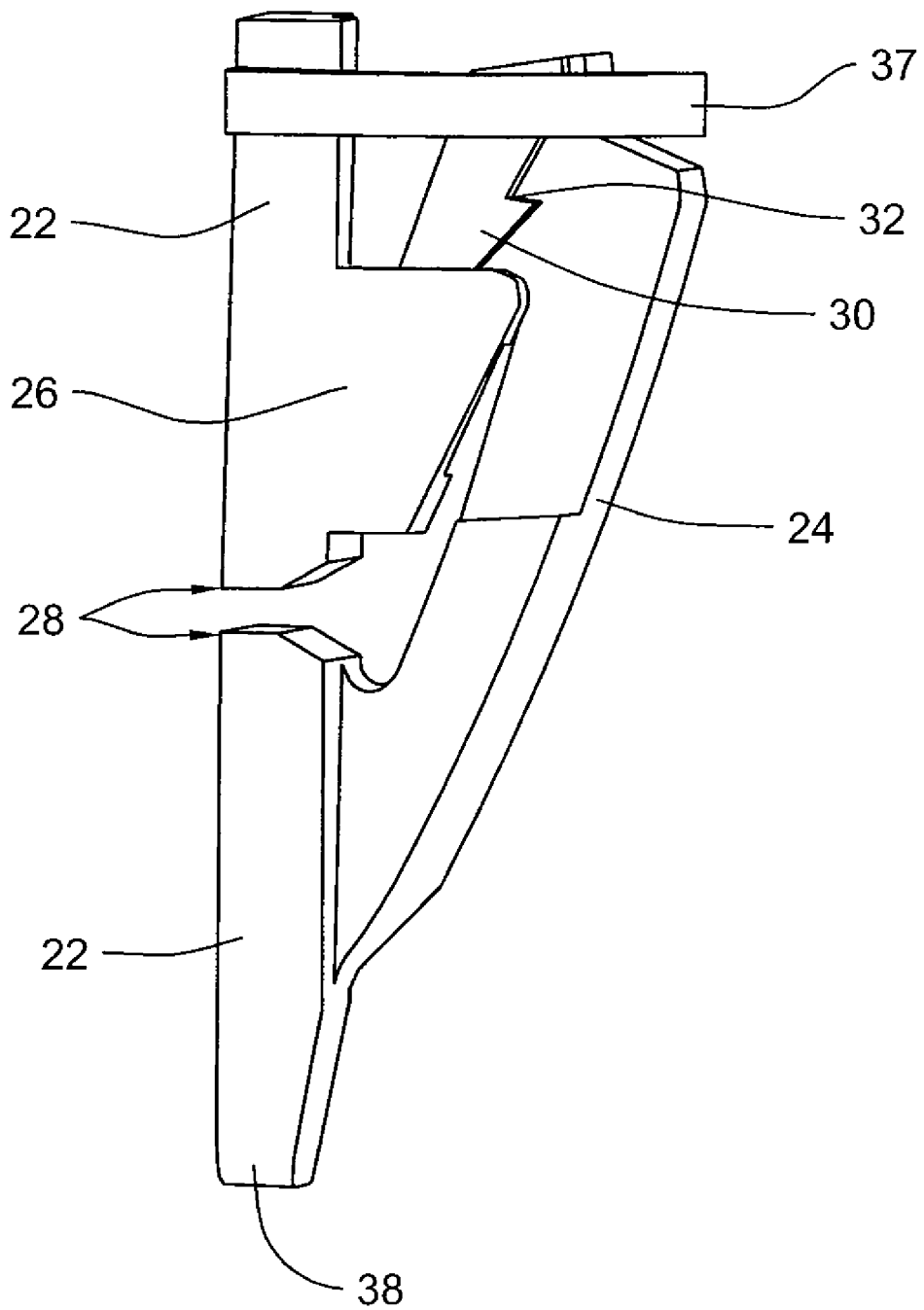
FIG. 6 is an isometric partial view of the w-base fastener of FIG. 5, illustrating the positions of the hook and leg as the fastener is being uninstalled, after the upper portion of the fastener has been pulled away from the lower portion of the fastener.

FIG. 5 illustrates the position of a portion of the hook and leg, relative to the panel hole edge 37, after the fastener has been subjected to a load sufficient to separate the fastener at the break joint. Referring to FIG. 6, once this break occurs, the separation of the upper portion of the body 22 from the lower portion at break joint 28 will cause the hooks 26 to engage the legs 24 and draw the legs 24 toward the body 22, thus disengaging the legs from the backside of the panel on which the fastener is mounted. Once in this position, the body 22 and legs 24 will freely pass out of the hole without interference with the panel hole edge 37. When an extension joint is employed, the fastener 10 can then be reset and reused in the same application, if desired.

Figure 7:
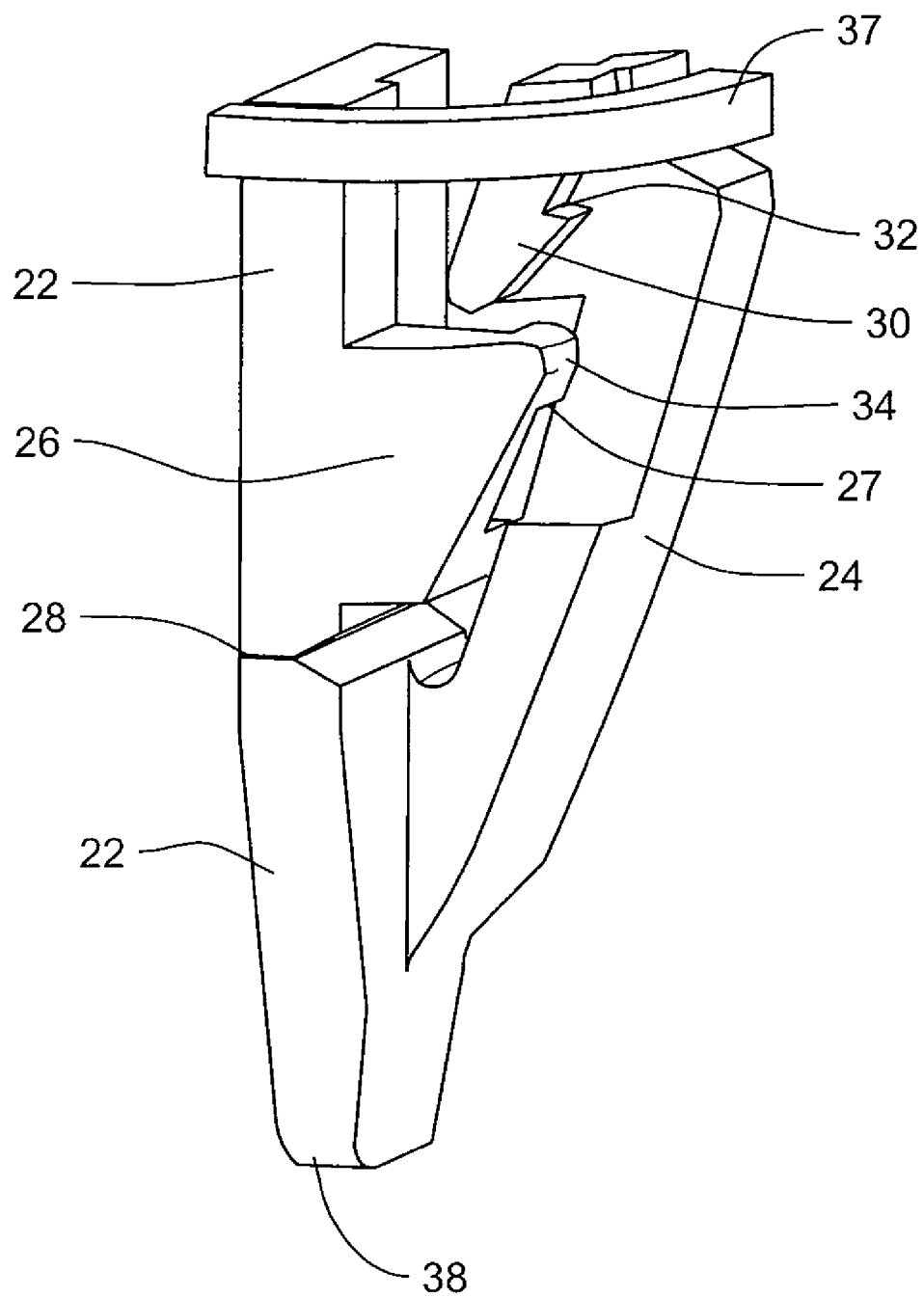
FIG. 7 is an isometric partial view of an exemplary embodiment of a w-base fastener of the present invention, during installation into a panel.
Figure 9:
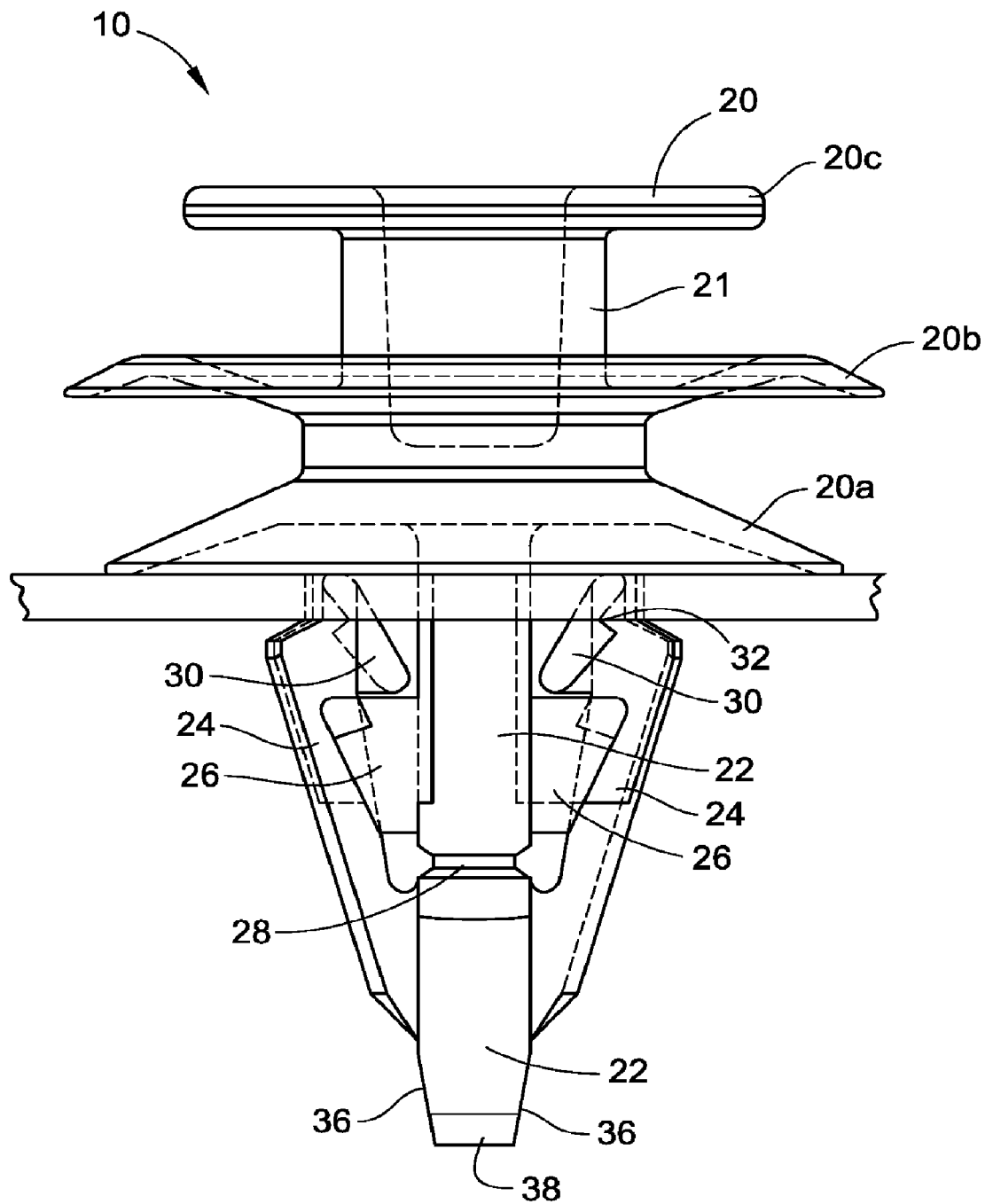
FIG. 9 is a side view of the embodiment partially illustrated in FIG. 7.

In use, when the fastener 10 is inserted into a hole formed in a panel, the fastener 10 behaves similar to known w-base fasteners. That is, as shown in the partial view in FIG. 7 and full side view in FIG. 9, the legs 24 flex inward by pressure exerted on the legs by the panel hole edge 37. After completely passing through the panel hole, the legs 24 flex outward creating interference between the backside of the panel and the legs 24. The head portion 20a will contact the front side of the panel and the combination of the legs 24 contacting the backside of the panel and the head portion 20a contacting the front side of the panel secures the fastener to the panel.

It should be understood that the secondary connection of the invention is not limited to the panel hole and retaining tab configuration or the use of a break joint. As mentioned above, the fastener 10 may comprise a joint 28 that functions as an extension joint. The function of the extension joint is to both provide separation of the two portions of the fastener 10 to activate the engagement of the hooks 26 with the legs 24, and to allow the two portions to be reconnected so that the fastener may be reused. The extension joint may be reusable through the employment of a two-part clasp means configured to open upon application of a predetermined load, where one part of the clasp is disposed directly below the extension joint separation point and the other part of the clasp is disposed directly above the extension joint separation point. Any suitable clasp means may be used that will open when subjected to a predetermined force in a non-destructive manner, such that the clasp may be closed again and remain closed until at least the same predetermined load is applied to the clasp.

In an embodiment, body 22 further comprises a hollow center containing a separate axial inner portion element. The inner portion element may have an upper end and a lower end, and the lower end may be integrally formed with the interior of body 22. The upper end, however, may be configured to allow the portion of the fastener 10 above the joint 28 to slide up to the top of the inner portion element, on which is disposed a positive stop. Thus the w-base fastener is prevented from completely separating into two pieces. In an alternate aspect, a hollow portion of body 22 may contain a flexible tether configured to connect the upper and lower portions of fastener 10 as a secondary means to prevent the loss of the w-base end of the fastener during or after extraction from use. Other embodiments and configurations are possible to provide the secondary connection or similar releasable connection and are considered within the scope of the invention.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A w-base fastener comprising:
   a fastener body defining a first end and a second end,
   a break joint formed in the body between the first end and second end, the break joint configured to break at a specified location when subjected to a predetermined pulling load so as to allow the first end and the second end to move a distance away from one another,
   a plurality of legs attached to the second end of the body, the legs extending at an angle toward the first end, each leg terminating in a leg tab, and
   a plurality of hooks disposed on the body between the break joint and the first end, the hooks including a portion configured to slidingly engage the leg tabs and pull them inward toward the fastener body when the break joint is subjected to the predetermined load, the hooks and the leg tabs being further configured and arranged so as to not engage one another until the break joint breaks.

2. The w-base fastener of claim 1 further comprising a head formed with the first end of the fastener body.

3. The w-base fastener of claim 2 wherein the head defines multiple head portions.

4. The w-base fastener of claim 3 wherein one of the multiple head portions defines a contact surface.

5. The w-base fastener of claim 1 wherein the fastener body further comprises a ledge disposed below the hook, the ledge configured to provide a positive stop for the leg.

6. The w-base fastener of claim 1 wherein the leg tab defines a notch formed at an upper end of the leg tab and the hook comprises a hook tab configured to engage the leg tab notch.

7. The w-base fastener of claim 1 wherein the leg tab is angled.

8. The w-base fastener of claim 1 wherein the hooks extend substantially perpendicular to the body.

9. The w-base fastener of claim 1 wherein the hook further comprises a lead-in element disposed on an upper surface of the hook to assist in the initial engagement of the leg tab.

10. The w-base fastener of claim 1 wherein the second end comprises opposing tapered portions.

11. The w-base fastener of claim 1 wherein the hook further comprises a lead-in element disposed on an upper surface of the hook to assist in the initial engagement of the leg tab.

12. A w-base fastener configured for insertion into a hole of a panel, the panel having a first side and a second side, the fastener comprising:
    a fastener body defining a first end and a second end,
    a head formed with the first end of the fastener body, the head adapted for placement adjacent to the first side of the panel and further configured to prevent the fastener from completely passing through the hole in which the fastener is mounted,
    a joint formed in the body between the first end and second end,
    a plurality of legs joined generally at the second end, the legs extending outwardly from the body at an angle and towards the first end, each leg terminating in a leg tab, the legs configured for engagement against the second side of the panel, and
    a plurality of hooks connected to the body between the joint and the head, the hooks extending substantially perpendicular to the body and having a portion configured to slidingly engage the leg tabs and pull them inward toward the fastener body when a portion of the fastener body between the joint and the first end is moved away from a portion of the fastener body between the joint and the second end when the first end is caused to be separated from the second end at the joint.

13. The w-base fastener of claim 12 wherein the fastener body further comprises a ledge disposed below the hook, the ledge configured to provide a positive stop for the leg.

14. The w-base fastener of claim 12 wherein the leg tab defines a notch formed at an upper end of the leg tab and the hook comprises a hook tab configured to engage the leg tab notch.

15. The w-base fastener of claim 14 wherein the leg tab is angled.

16. The fastener of claim 14 wherein the second end comprises opposing tapered portions.

17. The w-base fastener of claim 12 wherein the head defines multiple head portions.

18. The w-base fastener of claim 17 wherein one of the multiple head portions defines a contact surface.

19. A w-base fastener comprising:
- a fastener body defining a first end and a second end,
- a head formed with the first end of the fastener body,
- a joint formed in the body between the first end and second end,
- a plurality of legs joined generally at the second end, the legs extending outwardly from the body at an angle and towards the first end, each leg terminating in a leg tab, wherein the leg tab defines a notch formed at an upper end of the leg tab,
- a plurality of hooks connected to the body between the joint and the first end, the hooks extending substantially perpendicular to the body and defining hook tabs configured to slidingly engage the notch formed in the leg tabs and pull them inward toward the fastener body when a portion of the fastener body between the joint and the first end is moved away from a portion of the fastener body between the joint and the second end when the first end is caused to be separated from the second end at the joint, and
- wherein the fastener body further comprises a ledge disposed below the hook, the ledge configured to provide a positive stop for the leg.

* * * * *